United States Patent
Yasuda

(10) Patent No.: US 10,623,886 B2
(45) Date of Patent: Apr. 14, 2020

(54) POSITION MANAGEMENT METHOD, POSITION MANAGEMENT SYSTEM, AND POSITION MANAGEMENT PROGRAM PROVIDING POSITION INFORMATION TO SERVER USING MOBILE COMMUNICATION APPARATUS CARRIED BY USER IN VEHICLE

(71) Applicant: SYSMEX CORPORATION, Kobe-shi, Hyogo (JP)

(72) Inventor: Akihiko Yasuda, Kobe (JP)

(73) Assignee: SYSMEX CORPORATION, Kobe-shi (JP)

( * ) Notice: Subject to any disclaimer, the term of this patent is extended or adjusted under 35 U.S.C. 154(b) by 0 days.

(21) Appl. No.: 15/952,289

(22) Filed: Apr. 13, 2018

(65) Prior Publication Data

US 2018/0302742 A1    Oct. 18, 2018

(30) Foreign Application Priority Data

Apr. 14, 2017    (JP) .................................. 2017-080194

(51) Int. Cl.
| | | |
|---|---|---|
| *H04W 4/02* | (2018.01) | |
| *H04W 4/021* | (2018.01) | |
| *H04W 4/029* | (2018.01) | |
| *H04W 4/48* | (2018.01) | |
| *H04W 4/80* | (2018.01) | |
| *H04W 4/44* | (2018.01) | |

(52) U.S. Cl.
CPC ............ *H04W 4/02* (2013.01); *H04W 4/021* (2013.01); *H04W 4/029* (2018.02); *H04W 4/48* (2018.02); *H04W 4/44* (2018.02); *H04W 4/80* (2018.02)

(58) Field of Classification Search
CPC .. H60R 25/102; H60R 25/33; G06Q 30/0266; H04W 4/02; H04W 4/80; H04W 4/46; H04W 4/48; H04W 4/023; H04W 4/025; H04W 4/029; H04W 12/00503; H04W 64/00; H04W 72/00; H04W 80/00; H04W 80/02; H04W 80/04; H04W 80/08; H04W 4/44; H04W 4/021
See application file for complete search history.

(56) References Cited

U.S. PATENT DOCUMENTS

| | | | | |
|---|---|---|---|---|
| 7,164,924 | B2 * | 1/2007 | Ueda et al. ................. | 455/456.1 |
| 7,966,025 | B1 * | 6/2011 | O'Neil ........................ | 455/456.4 |
| 8,805,411 | B2 * | 8/2014 | Furuta .................... | H04W 24/00 |
| 9,232,345 | B1 * | 1/2016 | Rencher et al. ....... | H04W 4/008 |
| 9,672,570 | B1 * | 6/2017 | Slusar et al. ........... | G06Q 40/08 |
| 9,818,239 | B2 * | 11/2017 | Pal et al. ................. | G07C 5/02 |

(Continued)

FOREIGN PATENT DOCUMENTS

JP    2002-334399 A    11/2002

*Primary Examiner* — Meless N Zewdu
(74) *Attorney, Agent, or Firm* — Metrolex IP Law Group, PLLC

(57) ABSTRACT

A position management method according to one or more embodiments may use a mobile communication apparatus that is capable of obtaining position information. The method may include: receiving, by the mobile communication apparatus, a communication signal transmitted from an onboard communication device provided in a vehicle; and transmitting, from the mobile communication apparatus that receives the communication signal, the obtained position information to a management server.

20 Claims, 14 Drawing Sheets

(56) References Cited

U.S. PATENT DOCUMENTS

| | | | |
|---|---|---|---|
| 2003/0018428 A1* | 1/2003 | Knockeart et al. | 701/210 |
| 2011/0018736 A1* | 1/2011 | Carr | 340/902 |
| 2012/0259540 A1* | 10/2012 | Kishore et al. | 701/410 |
| 2014/0028477 A1 | 1/2014 | Michalske | |
| 2014/0032014 A1* | 1/2014 | Debiasio et al. | H04B 7/24 |
| 2014/0058802 A1* | 2/2014 | Warkentin et al. | G06Q 10/0639 |
| 2014/0278661 A1* | 9/2014 | Nielsen et al. | G06Q 10/063118 |
| 2015/0140962 A1* | 5/2015 | Mapes | H04W 4/028 |
| 2015/0323644 A9* | 11/2015 | Lee et al. | G01S 5/06 |
| 2016/0335596 A1* | 11/2016 | Richie et al. | G06Q 10/10 |
| 2018/0124573 A1* | 5/2018 | Lee | H04W 4/021 |
| 2018/0268704 A1* | 9/2018 | Balk | G08G 1/202 |
| 2018/0349809 A1* | 12/2018 | Herminghaus et al. | G06Q 10/047 |

\* cited by examiner

FIG. 10
VEHICLE POSITION DB

| VEHICLE ID | MAINTENANCE TECHNICIAN ID | CURRENT POSITION INFORMATION |
|---|---|---|
| Va | Ma | (N a1, E a2) |
| Vb | Mb | (N b1, E b2) |
| ⋮ | ⋮ | ⋮ |

FIG. 11
VEHICLE INFORMATION DB

| VEHICLE ID | BEACON ID |
|---|---|
| Va | Ba |
| Vb | Bb |
| ⋮ | ⋮ |

FIG. 12
WORK SCHEDULE DB

| MAINTENANCE TECHNICIAN ID | SCHEDULED JOB 1 | | SCHEDULED JOB 2 | | ... |
| | TIME SLOT | PLACE TO VISIT | TIME SLOT | PLACE TO VISIT | |
|---|---|---|---|---|---|
| Ma | 10:00–12:00 | Ca | 14:00–15:00 | Cb | ... |
| Mb | 13:00–14:00 | Cc | 15:00–17:00 | Cd | ... |
| ⋮ | ⋮ | ⋮ | ⋮ | ⋮ | ... |

FIG. 13
CLIENT DB

| CLIENT ID | CLIENT NAME | POSITION INFORMATION |
|---|---|---|
| Caa | Ca HOSPITAL | (N c1 , E c2) |
| Cbb | Cb HOSPITAL | (N d1 , E d2) |
| ⋮ | ⋮ | ⋮ |

FIG. 14
MAINTENANCE TECHNICIAN DB

| MAINTENANCE TECHNICIAN ID | MOBILE COMMUNICATION APPARATUS ID | ATTRIBUTE | ACQUIRED SKILL 1 | ACQUIRED SKILL 2 | ... |
|---|---|---|---|---|---|
| Ma | Ta | Aa | A APPARATUS | B APPARATUS | ... |
| Mb | Tb | Ab | B APPARATUS | C APPARATUS | ... |
| ⋮ | ⋮ | ⋮ | ⋮ | ⋮ | ... |

POSITION MANAGEMENT METHOD, POSITION MANAGEMENT SYSTEM, AND POSITION MANAGEMENT PROGRAM PROVIDING POSITION INFORMATION TO SERVER USING MOBILE COMMUNICATION APPARATUS CARRIED BY USER IN VEHICLE

CROSS REFERENCE TO RELATED APPLICATIONS

This application claims priority from prior Japanese Patent Application No. 2017-080194 filed with the Japan Patent Office on Apr. 14, 2017, the entire contents of which are incorporated herein by reference.

BACKGROUND

The disclosure relates to a position management method, a position management system, a position management program and a mobile communication apparatus.

There is a demand for managing positions of users that are moving by vehicles. For example, there is a demand that positions of vehicles of maintenance technicians for apparatuses at clients be managed using a management server provided in a support center or the like. Particularly in the case of medical apparatuses, it is desirable that when needs for maintenance service by a maintenance technician arise, the maintenance technician quickly be dispatched and provide the maintenance service. To this end, it is necessary to manage the positions of the maintenance technicians (users) moving by the vehicles in real time and accurately by using the management server.

A vehicle position information management method (position management method) for managing positions of vehicles used by maintenance technicians has been known heretofore (see Japanese Patent Application Publication No. 2002-334399 (Patent Document 1), for example). According to the vehicle position information management method disclosed in Patent Document 1, an onboard apparatus provided in each vehicle transmits position information on the vehicle to an external management server via a relay company at regular intervals, and the management server manages the position information on the vehicle. The onboard apparatus used in the vehicle position information management method includes a GPS receiver and a cellular phone module capable of cellular phone communications.

The vehicle position information management method disclosed in Patent Document 1 makes it necessary to provide each vehicle with the onboard apparatus including a mobile module capable of cellular phone communications. Thus, if there are multiple vehicles targeted for position management, it is necessary to provide all the vehicles with respective onboard apparatuses capable of cellular phone communications. This involves a problem that costs for the position management increases due to the necessity to make cellular phone communication contracts for all the onboard apparatuses.

Portable mobile communication apparatuses such as a smartphone have been widely used in recent years. Mobile communication apparatuses are capable of obtaining their position information, and performing information communications. Then, it is conceivable that: mobile communication apparatuses carried by users of vehicles obtain position information, and transmit the position information to a management server; and the management server manages the position information.

The transmission of the position information to the management server using the mobile communication apparatuses of the users, however, means that the external management server always manages the positions of the users. This makes it difficult to protect the privacy of the users located away from the vehicles.

SUMMARY

A position management method according to one or more embodiments may use a mobile communication apparatus that is capable of obtaining position information. The method may include: receiving, by the mobile communication apparatus, a communication signal transmitted from an onboard communication device provided in a vehicle; and transmitting, from the mobile communication apparatus that receives the communication signal, the obtained position information to a management server.

A position management system according to one or more embodiments may include: a mobile communication apparatus including a position information obtaining unit that obtains position information; an onboard communication device that is provided in a vehicle and that transmits a communication signal; and a management server. The mobile communication apparatus that receives the communication signal may transmit the position information to the management server.

According to one or more embodiments, a non-transitory computer-readable recording medium storing a position management program that causes a mobile communication apparatus capable of obtaining position information to perform operations may include: receiving a communication signal transmitted by an onboard communication device provided in a vehicle; and transmitting, based on the received communication signal, the position information to a management server.

A mobile communication apparatus according to one or more embodiments may include: a position information obtaining unit that obtains position information; a communication unit that transmits and receives information; and a controller. The controller may transmit the position information via the communication unit to a management server in a condition in which the controller receives a communication signal transmitted by an onboard communication device provided in a vehicle.

One or more aspect may manage the position of a user in real time and accurately using an external management server while protecting the privacy of the user, without additionally providing a device capable of cellular phone communications to the vehicle.

BRIEF DESCRIPTION OF DRAWINGS

FIG. 10 is a diagram illustrating an example of a vehicle position database;

FIG. 11 is a diagram illustrating an example of a vehicle information database;

FIG. 12 is a diagram illustrating an example of a work schedule database;

FIG. 13 is a diagram illustrating an example of a client database;

FIG. 14 is a diagram illustrating an example of a maintenance technician database;

DETAILED DESCRIPTION

Figure 1:
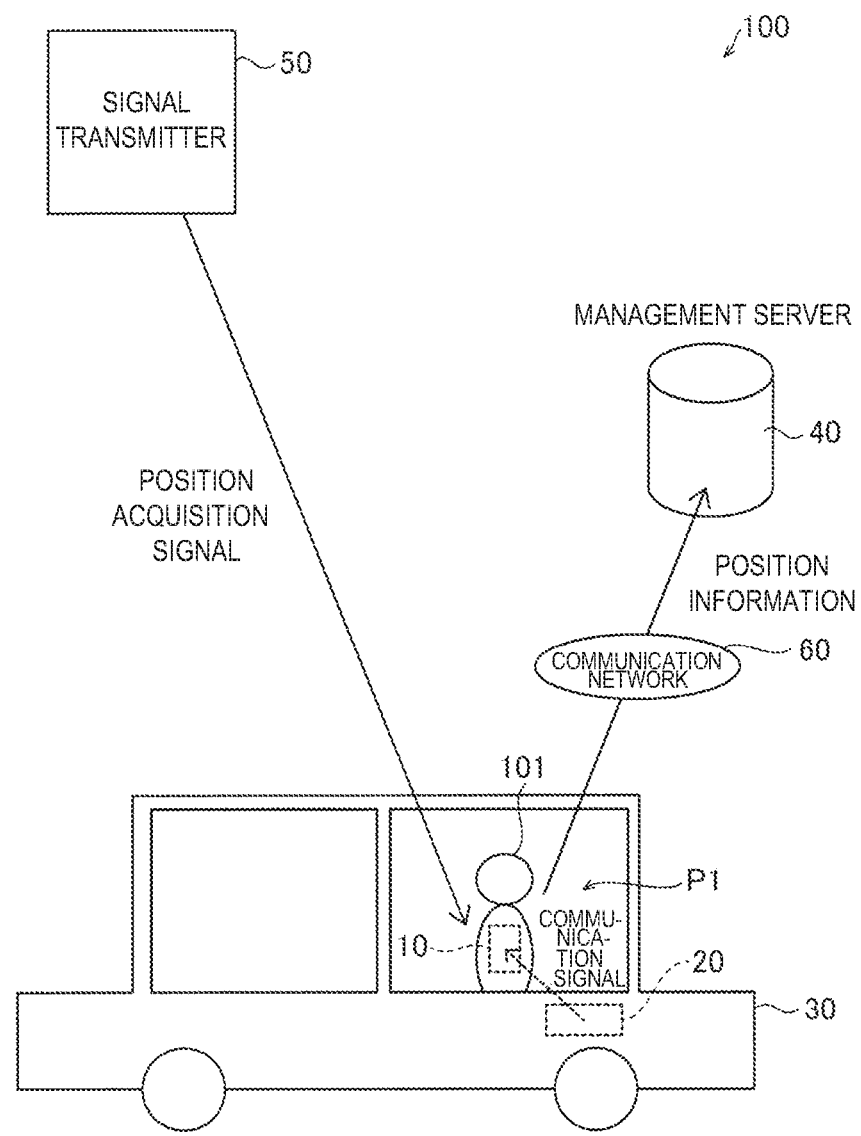
FIG. 1 is a diagram illustrating an outline of a position management method.

A position management method according to a first aspect is a position management method using a mobile communication apparatus 10 that is capable of obtaining position information. The position management method includes: receiving, by the mobile communication apparatus, a communication signal transmitted from an onboard communication device 20 provided in a vehicle 30; and transmitting, from the mobile communication apparatus 10 that receives the communication signal, the position information to a management server 40.

The position management method according to a first aspect causes the mobile communication apparatus 10 that receives the communication signal to transmit the position information to the management server 40, as discussed above. Thereby, the mobile communication apparatus 10 can transmit the position information, which the mobile communication apparatus 10 obtains, to the external management server 40 when the mobile communication apparatus 10 is located near the onboard communication device 20 provided in the vehicle 30, and the external management server 40 can manage the position of the vehicle. In addition, when the mobile communication apparatus 10 is located at too far a distance to receive the communication signal, the mobile communication apparatus 10 can be stopped from transmitting the position information to the management server 40. Accordingly, when the mobile communication apparatus 10 is not located in or near the vehicle 30, the position management method is capable of inhibiting the transmission of the position of a user 101 carrying the mobile communication apparatus 10 to the management server 40. Thereby, the privacy of the user 101 located away from the vehicle 30 can be protected. Furthermore, without additionally providing the vehicle 30 with an onboard device capable of cellular phone communications, use of the mobile communication apparatus 10 that the user 101 is carrying enables the external management server 40 to easily manage the position. As a result of these, the position management method is capable of managing the position in real time and accurately using the external management server 40 while protecting the privacy of the user 101, without additionally providing a device capable of cellular phone communications to the vehicle 30.

It may be preferable that the position management method according to a first aspect includes transmitting, by the mobile communication apparatus 10, the obtained position information to the management server 40 based on the receiving the communication signal. Thereby, while the mobile communication apparatus 10 receives the communication signal, the mobile communication apparatus 10 can transmit the position information to the management server 40. Accordingly, the management server 40 can easily obtain and manage the position of the vehicle.

It may be preferable that the position management method according to a first aspect includes stopping the mobile communication apparatus 10 from transmitting the position information to the management server 40 while the mobile communication apparatus 10 does not receive a communication signal transmitted from the onboard communication device 20. This configuration is capable of effectively inhibiting the mobile communication apparatus 10 from transmitting the position information to the management server 40 when the mobile communication apparatus 10 is not located in or near the vehicle 30, and thereby inhibiting the transmission of information on the position of the user 101 carrying the mobile communication apparatus 10 to the management server 40 when the mobile communication apparatus 10 is in a position away from the vehicle 30. Thus, the position management method is capable of effectively protecting the privacy of the user 101 located away from the vehicle 30.

In the position management method according to a first aspect, it may be preferable that the mobile communication apparatus 10 is capable of using data communications while being carried by the user 101 of the vehicle 30. This configuration is capable of causing the mobile communication apparatus 10 carried by the user 101 to obtain the position information, and to transmit the position information to the management server 40, unlike when a device for obtaining and transmitting the position information to the management server 40 is provided in the vehicle 30. This makes it unnecessary that the vehicle 30 is additionally provided with a device that has a data communication function.

It may be preferable that the position management method according to a first aspect includes: determining that the vehicle 30 is within a predetermined distance from the mobile communication apparatus 10 when the mobile communication apparatus 10 receives the communication signal; and causing the mobile communication apparatus 10 to transmit the obtained position information to the management server 40 if the vehicle 30 is within the predetermined distance from the mobile communication apparatus 10. This configuration is capable of inhibiting the mobile communication apparatus 10 from transmitting the position information, as the position of the vehicle 30, to the management server 40 if the position of the vehicle 30 is beyond the predetermined distance from the mobile communication apparatus 10, and thereby to inhibit the transmission of the position information to the management server 40 when the position information represents the position of the vehicle 30 with decreased accuracy. In addition, if the position of the vehicle 30 is beyond the predetermined distance from the mobile communication apparatus 10, the position information on the user 101 located away from the vehicle 30 is not transmitted to the management server 40. Accordingly, the position management method is capable of effectively protecting the privacy of the user 101.

In the position management method according to a first aspect, it may be preferable that the onboard communication device 20 in compliance with a predetermined short-range wireless communication standard transmits the communication signal. This configuration makes it possible to easily detect that the mobile communication apparatus 10 is located near or in the vehicle 30, by providing the vehicle 30 with the onboard communication device 20 in compliance with the predetermined short-range wireless communication standard.

In this case, it may be preferable that the onboard communication device 20 in compliance with a predetermined low-power short-range wireless communication standard transmits the communication signal. This configuration is capable of saving the power consumption for the onboard communication device 20 to transmit the communication signal.

In the position management method according to a first aspect, it may be preferable that the onboard communication device 20 transmits the communication signal able to reach a location at which the vehicle 30 is accessible by the user 101 of the vehicle 30. In this configuration, the communication signal does not reach the mobile communication apparatus 10 if the user 101 of the vehicle 30 is located at such a distance that the user 101 cannot access the vehicle 30. Accordingly, the position management method is capable of effectively inhibiting the transmission of the information on the position of the user 101 carrying the mobile communication apparatus 10 to the management server 40 when the mobile communication apparatus 10 is in a position away from the vehicle 30.

In the position management method according to a first aspect, it may be preferable that the onboard communication device 20 in compliance with a predetermined short-range wireless communication standard transmits the communication signal with a theoretical reachable distance in a range of 2 meters or less. In this configuration, the mobile communication apparatus 10 is capable of receiving the communication signal while being located inside a generally-used passenger car, whereas the mobile communication apparatus 10 is incapable of receiving the communication signal while being located in a position outside the generally-used passenger car.

It may be preferable that the position management method according to a first aspect includes causing the mobile communication apparatus 10, at predetermined time, to activate a function of receiving the communication signal from the onboard communication device 20. This configuration is capable of causing the mobile communication apparatus 10 to activate the function of receiving the communication signal from the onboard communication device 20, when the predetermined time comes even if the communication signal receiving function of the mobile communication apparatus 10 is deactivated. Accordingly, after the predetermined time passes, the mobile communication apparatus 10 can certainly receive the communication signal while being located at a distance close enough to receive the communication signal.

It may be preferable that the position management method according to a first aspect includes: transmitting, from the mobile communication apparatus 10, first identification information, together with the position information, to the management server 40; and associating, by the management server 40, the position information with the vehicle 30 based on the first identification information. The first identification information is included in the communication signal and includes information on the vehicle 30. When there are multiple vehicles 30, this configuration enables the management server 40 to manage the positions of the respective vehicles 30 distinguishably.

It may be preferable that the position management method according to a first aspect includes: transmitting, from the mobile communication apparatus 10, second identification information, together with the position information, to the management server 40; and associating, by the management server 40, the position information with the user 101 of the vehicle 30 based on the second identification information. The second identification information includes information on the mobile communication apparatus 10. This configuration enables the management server 40 to manage the positions of the respective users 101 travelling by the vehicles 30 distinguishably on a user-by-user 101 basis.

In this case, it may be preferable that the management server 40 associate the position information with a work schedule of the user 101 of the vehicle 30 based on the second identification information. In this configuration, the management server 40 can easily grasp what condition each user 101 travelling by the vehicle 30 is in, based on the position and work schedule of the user 101.

It may be preferable that the position management method according to a first aspect includes: finding vehicles 30 and users 101 of the respective vehicles (30) that are within a predetermined distance from a client facility, based on the position information transmitted from mobile communication apparatuses 10; and determining which user 101 to dispatch to the client facility based on work schedule information on the found users 101. This configuration is capable of choosing a user 101 who is near the client facility and available according to his/her work schedule, from the users 101 of all the vehicles 30, and thereby dispatching the user 101 to the client facility quickly.

It may be preferable that the position management method according to a first aspect includes: finding the vehicles 30 and the users 101 of the respective vehicles 30 that are within the predetermined distance from the client facility, based on the position information transmitted from the mobile communication apparatuses 10; and determining which user 101 to dispatch to the client facility based on attribute information on the found users 101. This configuration is capable of choosing a user 101 who is near the client facility and has an attribute suitable for the client facility, from the users 101 of all the vehicles 30, and thereby dispatching the user 101 having the attribute suitable for the client facility, to the client facility quickly.

It may be preferable that the position management method according to a first aspect includes: based on the position information transmitted from the mobile communication apparatuses 10, finding the vehicles 30 and the users 101 of the respective vehicles 30 that are within the predetermined distance from the client facility based on skill information on the found users 101, determining which user 101 to dispatch to the client facility. This configuration is capable of choosing a user 101 who is near the client facility and has a skill suitable for the client facility, from the users 101 of the respective vehicles 30, and thereby dispatching the user 101 having the skill suitable for the client facility, to the client facility quickly.

It may be preferable that the position management method according to a first aspect includes: receiving, by the mobile communication apparatus 10, a position acquisition signal transmitted by a signal transmitter 50; and based on the received position acquisition signal, obtaining, by the mobile communication apparatus 10 the position information. In this configuration, the mobile communication apparatus 10 can obtain the position information easily and accurately.

A position management system 100 according to a second aspect includes: a mobile communication apparatus 10 including a position information obtaining unit 13 that obtains position information; an onboard communication device 20 that is provided in a vehicle 30 and that transmits a communication signal; and a management server 40. The mobile communication apparatus 10 that receives the communication signal transmits the position information to the management server 40.

In the position management system 100 according to a second aspect, as discussed above, the mobile communication apparatus 10 that receives the communication signal transmit the position information to the management server 40. Thereby, when the mobile communication apparatus 10 is located near the onboard communication device 20 provided in the vehicle 30, the mobile communication apparatus 10 can transmit the position information, which the position information obtaining unit 13 obtains, to the external management server 40. Accordingly, the external management server 40 can manage the position. In addition, when the mobile communication apparatus 10 is located at too far a distance to receive a communication signal, the mobile communication apparatus 10 can be stopped from transmitting the position information to the management server 40. Accordingly, when the mobile communication apparatus 10 is not located near or in the vehicle 30, the position management system 100 is capable of inhibiting the transmission of the position of a user 101 carrying the mobile communication apparatus 10 to the management server 40. This protects the privacy of the user 101 located away from the vehicle 30. Furthermore, without additionally providing the vehicle 30 with an onboard device capable of cellular phone communications, use of the mobile communication apparatus 10 carried by the user 101 enables the external management server 40 to easily manage the position. As a result of these, it is possible to manage the position in real time and accurately using the external management server 40 while protecting the privacy of the user 101, without additionally providing a device capable of cellular phone communications to the vehicle 30.

A position management program 110 according to a third aspect is a position management program 110 that causes a mobile communication apparatus 10 capable of obtaining position information to perform a position management method using the mobile communication apparatus 10. The position management program 110 causes a mobile communication apparatus 10 to perform operations including: receiving, by the mobile communication apparatus 10, a communication signal transmitted from an onboard communication device 20 provided in a vehicle 30; and transmitting, from the mobile communication apparatus 10 that receives the communication signal, the position information to a management server 40.

The position management program 110 according to a third aspect causes the mobile communication apparatus 10 that receives the communication signal to transmit the position information to the management server 40, as discussed above. Thereby, when the mobile communication apparatus 10 is located near the onboard communication device 20 provided in the vehicle 30, the mobile communication apparatus 10 can transmit the position information, which the mobile communication apparatus 10 obtains, to the external management server 40. Accordingly, the position management program 110 is capable of managing the position using the external management server 40. In addition, when the mobile communication apparatus 10 is located at too far a distance to receive a communication signal, the mobile communication apparatus 10 can be stopped from transmitting the position information to the management server 40. Accordingly, when the mobile communication apparatus 10 is not located near or in the vehicle 30, the position management program 110 is capable of inhibiting the transmission of the position of a user 101 carrying the mobile communication apparatus 10 to the management server 40, and thereby protecting the privacy of the user 101 located away from the vehicle 30. Furthermore, without additionally providing the vehicle 30 with an onboard device capable of cellular phone communications, use of the mobile communication apparatus 10 carried by the user 101 enables the external management server 40 to easily manage the position. As a result of these, it is possible to manage the position in real time and accurately using the external management server 40 while protecting the privacy of the user 101, without additionally providing a device capable of cellular phone communications to the vehicle 30.

A mobile communication apparatus 10 according to a fourth aspect includes: a position information obtaining unit 13 that obtains position information; a communication unit 14 that transmits and receives information; and a controller 11. The controller 11 is configured to transmit the position information via the communication unit 14 to a management server 40 when the controller receives a communication signal transmitted by an onboard communication device 20 provided in a vehicle.

In the mobile communication apparatus 10 according to a fourth aspect, the controller 11 is configured to transmit the position information via the communication unit 14 to the management server 40 in response to reception of the communication signal that the onboard communication device 20 provided in the vehicle 30 transmits, as discussed above. Thereby, the mobile communication apparatus 10 is capable of transmitting the position information, which the position information obtaining unit 13 obtains, to the external management server 40 when mobile communication apparatus 10 is located near the onboard communication device 20 provided in the vehicle 30. Accordingly, the external management server 40 can manage the position. In addition, when the mobile communication apparatus 10 is located at too far a distance to receive a communication signal, the mobile communication apparatus 10 is capable of stopping transmitting the position information to the management server 40, and thereby inhibiting the transmission of the position of a user 101 carrying the mobile communication apparatus 10 to the management server 40 when the mobile communication apparatus 10 is not located near the vehicle 30. This can protect the privacy of the user 101 located away from the vehicle 30. Furthermore, without additionally providing an onboard device capable of cellular phone communications to the vehicle 30, use of the mobile communication apparatus 10 carried by the user 101 enables the external management server 40 to easily manage the position. As a result of these, it is possible to manage the position in real time and accurately using the external management server 40 while protecting the privacy of the user 101, without additionally providing a device capable of cellular phone communications to the vehicle One or more aspects may be capable of managing the position in real time and accurately using the external management server while protecting the privacy of the user, without additionally providing a device capable of cellular phone communications to the vehicle.

Embodiments are hereinbelow explained with reference to the drawings.

[Outline of Position Management Method]

Referring to FIG. 1, descriptions are provided for a position management method using a mobile communication apparatus 10 of one or more embodiments.

The position management method according to one or more embodiments is a position management method using the mobile communication apparatus 10 that is capable of obtaining position information.

The mobile communication apparatus 10 is a terminal that a user 101 carries and uses. The mobile communication apparatus 10 is capable of data communications while carried by the user 101 of a vehicle 30. Specifically, the mobile communication apparatus 10 is configured to be capable of data communications via a communication network 60. The mobile communication apparatus 10 is, for example, a smartphone, a tablet computer, or a cellular phone. The communication network 60 is, for example, a communication network for cellular phone communications.

The mobile communication apparatus 10 is capable of obtaining the position information. Specifically, the mobile communication apparatus 10 obtains global position coordinates based on a position acquisition signal that a signal transmitter 50 transmits. For example, the mobile communication apparatus 10 may obtain the position information using the Global Positioning System (GPS). Alternatively, the mobile communication apparatus 10 may obtain the position information, through Wi-Fi communications, based on the location of a base station and the distance of the mobile communication apparatus 10 from the base station. Otherwise, the mobile communication apparatus 10 may obtain the position information, through cellular phone communications, based on the location of a base station and the distance of the mobile communication apparatus 10 from the base station. Instead, the mobile communication apparatus 10 may obtain the position information through Bluetooth (registered trademark) communications. In other words, the signal transmitter 50 is, for example, GPS satellites, a Wi-Fi base station, a cellular phone base station, or a Bluetooth communication transmitter. The mobile communication apparatus 10 may obtain the position information by calculating the current position based on a signal that the signal transmitter 50 transmits. Furthermore, the mobile communication apparatus 10 may obtain the position information by receiving a signal including the position information that the signal transmitter 50 transmits. The position information may be two-dimensional position information, or three-dimensional position information.

The mobile communication apparatus 10 is capable of receiving a communication signal that an onboard communication device 20 transmits. For example, the onboard communication device 20 in compliance with a predetermined short-range wireless communication standard transmits the communication signal. Specifically, the onboard communication device 20 in compliance with a predetermined low-power short-range wireless communication standard transmits the communication signal. The communication signal is transmitted in compliance with Bluetooth standard, ZigBee standard, UWB standard or the like. For example, the communication signal is transmitted in compliance with Bluetooth 4.0 (Bluetooth Low Energy (BLE)).

The onboard communication device 20 is provided in the vehicle 30. The onboard communication device 20 is capable of transmitting the communication signal. The communication signal includes identification information. The identification information is information unique to the onboard communication device 20 that transmits the identification information. The onboard communication device 20 is disposed, for example, inside the dashboard, the compartment space, the trunk room, or the like of the vehicle 30. The onboard communication device 20 may always or intermittently transmit the communication signal. For example, the onboard communication device 20 may transmit the communication signal at intervals of approximately 1 second to 1 minute.

The vehicle 30 is used by the user 101 for his/her movement. The vehicle 30 is, for example, a four-wheeled passenger car. Incidentally, the vehicle 30 may be a two-wheeled vehicle such as a motorbike or a bicycle, or a three-wheeled vehicle. Otherwise, the vehicle 30 may be an automobile with five or more wheels, such as a bus or a truck.

A management server 40 is provided in order to manage the position of the vehicle 30, and the position of the user 101 travelling by the vehicle 30. The management server 40 is capable of data communications. The management server 40 is capable of receiving the position information from the mobile communication apparatus 10. The management server 40 is disposed in a base such as a service center. The management server 40 is capable of managing positions of a plurality of vehicles 30.

In one or more embodiments, the mobile communication apparatus 10 receives the communication signal that is transmitted from the onboard communication device 20 provided in the vehicle 30, and obtains the position information. After receiving the communication signal, the mobile communication apparatus 10 transmits the position information to the management server 40 responsible for the position management. For example, based on the reception of the communication signal by the mobile communication apparatus 10, the mobile communication apparatus 10 transmits the obtained position information to the management server 40. In other words, in a condition in which the mobile communication apparatus 10 is located at a distance close enough to receive the communication signal, the mobile communication apparatus 10 transmits the obtained position information to the management server 40.

Thereby, in a condition in which the mobile communication apparatus 10 is located near the onboard communication device 20 provided in the vehicle 30, the mobile communication apparatus 10 can transmit the position information, which the mobile communication apparatus 10 receives, to the external management server 40. Accordingly, the external management server 40 is capable of managing the position. In addition, in a condition in which the mobile communication apparatus 10 is located at too far a distance to receive the communication signal, the mobile communication apparatus 10 is capable of stopping transmitting the position information to the management server 40. Accordingly, in a condition in which the mobile communication apparatus 10 is not located in, on, or near the vehicle 30, it is possible to inhibit information on the position of the user 101 carrying the mobile communication apparatus 10 from being transmitted to the management server 40. Thereby, the privacy of the user 101 can be protected. Furthermore, without additionally providing an onboard device capable of cellular phone communications to the vehicle 30, use of the mobile communication apparatus 10 carried by the user 101 enables the external management server 40 to easily manage the position. As a result of these, it is possible to manage the position in real time and accurately using the external management server 40 while protecting the privacy of the user 101, without additionally providing a device capable of cellular phone communications to the vehicle 30.

In other words, when the user 101 carrying the mobile communication apparatus 10 is located in a position P1 where the mobile communication apparatus 10 can receive the communication signal that the onboard communication device 20 transmits, the mobile communication apparatus 10 transmits the position information on the current position to the management server 40.

Furthermore, in one or more embodiments, while the mobile communication apparatus 10 receives no communication signal that the onboard communication device 20 is transmitting, the mobile communication apparatus 10 stops transmitting the position information to the management server 40. This makes it possible to effectively inhibit the mobile communication apparatus 10 from transmitting the position information to the management server 40 in a condition in which the mobile communication apparatus 10 is not located in, on, or near the vehicle 30. Thereby, it is possible to inhibit the transmission of the information on the position of the user 101 carrying the mobile communication apparatus 10 to the management server 40 in a condition in which the mobile communication apparatus 10 in a position away from the vehicle 30. Therefore, it is possible to effectively protect the privacy of the user 101 located away from the vehicle 30.

In other words, in a condition in which the user 101 carrying the mobile communication apparatus 10 is located in a position P2 where the mobile communication apparatus 10 cannot receive the communication signal that the onboard communication device 20 is transmitting, the mobile communication apparatus 10 stops transmitting the position information on the current position to the management server 40. In this condition, the mobile communication apparatus 10 may stop obtaining the position information. Otherwise, the mobile communication apparatus 10 may obtain the position information as long as the mobile communication apparatus 10 does not transmit the position information to the management server 40.

[Example of Configuration of Position Management System]

Referring to FIGS. 2 to 17, descriptions are provided for an outline of a position management system 100 according to one or more embodiments.

Figure 2:
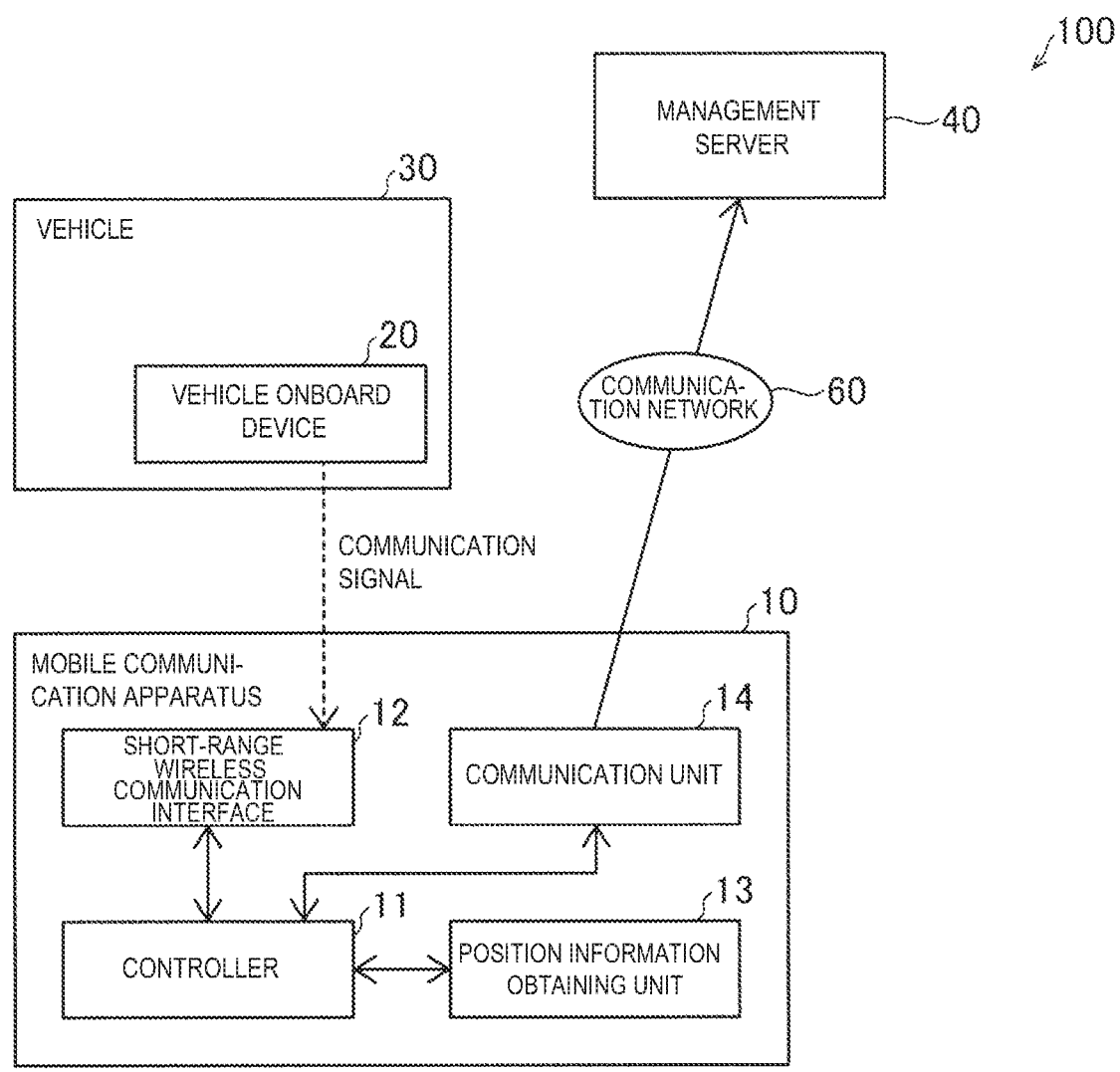
FIG. 2 is a block diagram illustrating an outline of a position management system.

The position management system 100 according to one or more embodiments is capable of managing the position of the vehicle 30. The position management system 100 is further capable of managing the position of the user 101 who is using the vehicle 30. As illustrated in FIG. 2, the position management system 100 includes the mobile communication apparatus 10, the onboard communication device 20, and the management server 40. The mobile communication apparatus 10 includes a controller 11, a short-range wireless communication interface 12, a position information obtaining unit 13, and a communication unit 14. The onboard communication device 20 is provided in the vehicle 30.

The mobile communication apparatus 10 is, for example, a mobile terminal such as a smartphone or a tablet computer. The mobile communication apparatus 10 may be a terminal privately owned by the user 101, or a terminal owned by a business corporation to which the user 101 belongs. For example, when the mobile communication apparatus 10 is intended to be used for maintenance service to an apparatus such as an inspection apparatus, it may be preferable that the mobile communication apparatus 10 be a terminal owned by a business corporation. The mobile communication apparatus 10 may further include a display that has a touch panel function.

The controller 11 is configured to control the units in the mobile communication apparatus 10. The controller 11 includes, for example, a central processing unit (CPU), and a memory. Furthermore, the controller 11 is capable of executing a position management program 110 (see FIG. 4) for the position management.

The short-range wireless communication interface 12 is an interface for short-range wireless communications. The short-range wireless communication interface 12 is capable of receiving and transmitting a short-range wireless communication signal. The short-range wireless communication interface 12 is, for example, in compliance with Bluetooth (for example, Bluetooth 4.0 (BLE)) standard, ZigBee standard, UWB standard or the like. The short-range wireless communication interface 12 is capable of communications within a range of approximately several centimeters to 100 meters. When the short-range wireless communication interface 12 is in compliance with BLE standard, the short-range wireless communication interface 12 is capable of communications within a range of approximately 1 centimeter to tens of meters. It is desirable that the short-range wireless communication interface 12 be capable of communications within a range of approximately 1 centimeter to 10 meters. The short-range wireless communication interface 12 is capable of receiving the communication signal that the onboard communication device 20 transmits. The short-range wireless communication interface 12 is capable of switching on and off the function of transmitting and receiving the communication signal.

The position information obtaining unit 13 is capable of obtaining the position information on the mobile communication apparatus 10. The position information obtaining unit 13 may obtain the position information using the GPS (Global Positioning System). Alternatively, the position information obtaining unit 13 may obtain the position information, through Wi-Fi communications, based on the location of a base station and the distance of the position information obtaining unit 13 from the base station. Otherwise, the position information obtaining unit 13 may obtain the position information, through cellular phone communications, based on the location of a base station and the distance of the position information obtaining unit 13 from the base station. Instead, the position information obtaining unit 13 may obtain the position information through Bluetooth communications. The position information obtaining unit 13 may obtain the position information by calculating the current position based on a signal that the signal transmitter 50 transmits. Furthermore, the position information obtaining unit 13 may obtain the position information by receiving a signal including the position information that the signal transmitter 50 transmits. The position information may be two-dimensional position information, or three-dimensional position information. The position information obtaining unit 13 is capable of switching on and off the function of obtaining the position information.

The communication unit 14 is an interface different from the short-range wireless communication interface 12. The communication unit 14 is capable of transmitting and receiving information. In other words, the communication unit 14 is capable of data communications. Specifically, the communication unit 14 is capable of data communications through the communication network 60. The communication unit 14 is capable of communications, for example, in compliance with a communication standard such as Wi-Fi standard, 3G standard, LTE standard, or 5G standard. The communication unit 14 is capable of communicating with the management server 40 through the communication network 60. The communication unit 14 is further capable of transmitting the position information, which the position information obtaining unit 13 obtains, to the management server 40. For example, based on the position information that the position information obtaining unit 13 obtains, the communication unit 14 may transmit the position information to the management server 40 each time the communication unit 14 moves a predetermined distance. Alternatively, the communication unit 14 may transmit the position information to the management server 40, for example, at intervals of a predetermined length of time.

The onboard communication device 20 is provided in the vehicle 30. In other words, the onboard communication device 20 is a device installed in the vehicle 30. In addition, the onboard communication device 20 is capable of transmitting the communication signal. Specifically, the onboard communication device 20 is capable of transmitting the communication signal that the short-range wireless communication interface 12 of the mobile communication apparatus 10 can receive. The onboard communication device 20 advertises the predetermined communication signal. The onboard communication device 20 is capable of controlling a reaching distance of the communication signal. The onboard communication device 20 is capable of controlling the reaching distance of the communication signal within a range of approximately several centimeters to 100 meters. The onboard communication device 20 is capable of transmitting the communication signal that includes identification information for uniquely identifying the transmission source device. The onboard communication device 20 is in compliance with a standard such as Bluetooth (for example, Bluetooth 4.0 (BLE)) standard, ZigBee standard, or UWB standard.

The onboard communication device 20 transmits the communication signal able to reach a location from which the user 101 of the vehicle 30 can access the vehicle 30. Thereby, in a condition in which the user 101 of the vehicle 30 stays in a location where the user 101 cannot access the vehicle 30, no communication signal reaches the mobile communication apparatus 10. Thus, in a condition in which the mobile communication apparatus 10 is located away from the vehicle 30, it can be effectively inhibited that the information on the position of the user 101 carrying the mobile communication apparatus 10 is transmitted to the management server 40. Incidentally, the location from which the user 101 of the vehicle 30 can access the vehicle 30 means, for example, a location where the user 101 can touch the vehicle 30, or a location where the user 101 can unlock the vehicle 30.

When, for example, the onboard communication device 20 is in compliance with a predetermined short-range wireless communication standard, the onboard communication device 20 is capable of transmitting the communication signal with a theoretical reachable distance in a range of 2 meters or less. With this configuration, the mobile communication apparatus 10 can receive the communication signal when the mobile communication apparatus 10 is located inside a generally-used passenger car, but cannot receive the communication signal when the mobile communication apparatus 10 is located outside a generally-used passenger car.

The management server 40 manages position information that a plurality of mobile communication apparatuses 10 transmit. The management server 40 manages positions of vehicles 30. For example, the management server 40 is used to manage the position information on each vehicle 30 that a user 101, an employee, uses as a company car. The management server 40 is also used to manage the position information on each user 101 of a vehicle 30. The management server 40 is placed, for example, in a support center or the like. Furthermore, the management server 40 is used to manage the position information on a company car that each product maintenance technician uses.

In one or more embodiments, in a condition in which the mobile communication device 10 is located at a distance close enough to receive the communication signal sent from the onboard communication device 20 provided in the vehicle 30, the controller 11 causes the communication unit 14 to transmit the position information, which the position information obtaining unit 13 obtains, to the management server 40 for the position management. Specifically, the controller 11 is configured to transmit the position information via the communication unit 14 to the management server 40 for the position management in response to reception of the communication signal sent from the onboard communication device 20 provided in the vehicle 30. For example, by executing the position management program 110, the controller 11 causes the mobile communication device 10 to receive the communication signal sent from the onboard communication device 20 provided in the vehicle 30, to obtain the position information, and to transmit the obtain position information to the management server 40 for the position management based on the reception of the communication signal by the mobile communication device 10. Thereby, in a condition in which the mobile communication device 10 is located near the onboard communication device 20 provided in the vehicle 30, the mobile communication device 10 can transmit the position information, which the position information obtaining unit 13 obtains, to the external management server 40. Accordingly, the external management server 40 can manage the position. In addition, in a condition in which the mobile communication apparatus 10 is located at too far a distance to receive the communication signal, the controller 11 is capable of stopping the mobile communication apparatus 10 from transmitting the position information to the management server 40, and thereby inhibiting the transmission of the information on the position of the user 101 carrying the mobile communication apparatus 10 to the management server 40 in a condition the mobile communication apparatus 10 is not located in, on, or near the vehicle 30. This can protect the privacy of the user 101 located away from the vehicle 30. Furthermore, without additionally providing an onboard device capable of cellular phone communications to the vehicle 30, use of the mobile communication apparatus 10 carried by the user 101 enables the external management server 40 to easily manage the position. As a result of these, it is possible to manage the position in real time and accurately using the external management server 40 while protecting the privacy of the user 101, without additionally providing a device capable of cellular phone communications to the vehicle 30. This makes it possible, for example, to rapidly dispatch a maintenance technician for a medical device when needs for work to be done by the maintenance technician for the medical device arise.

Moreover, in one or more embodiments, in a condition in which the mobile communication apparatus 10 receives the communication signal, the mobile communication apparatus 10 determines that the vehicle 30 exists within a predetermined distance from the mobile communication apparatus 10. In a condition in which the vehicle 30 exists within the predetermined distance from the mobile communication apparatus 10, the mobile communication apparatus 10 transmits the obtained position information to the management server 40. Thereby, in a condition in which the position of the vehicle 30 is beyond the predetermined distance from the mobile communication apparatus 10, it can be inhibited that the position information, as the position of the vehicle 30, is transmitted to the management server 40. Accordingly, it can be inhibited that the position information is transmitted to the management server 40 in a condition in which the position information represents the position of the vehicle 30 with decreased accuracy. In addition, when the position of the vehicle 30 is beyond the predetermined distance from the mobile communication apparatus 10, the mobile communication apparatus 10 withholds transmission of the position information on the user 101 located away from the vehicle 30 to the management server 40, and thereby is capable of effectively protecting the privacy of the user 101.

(Position Information Transmission Process)

Figure 3:
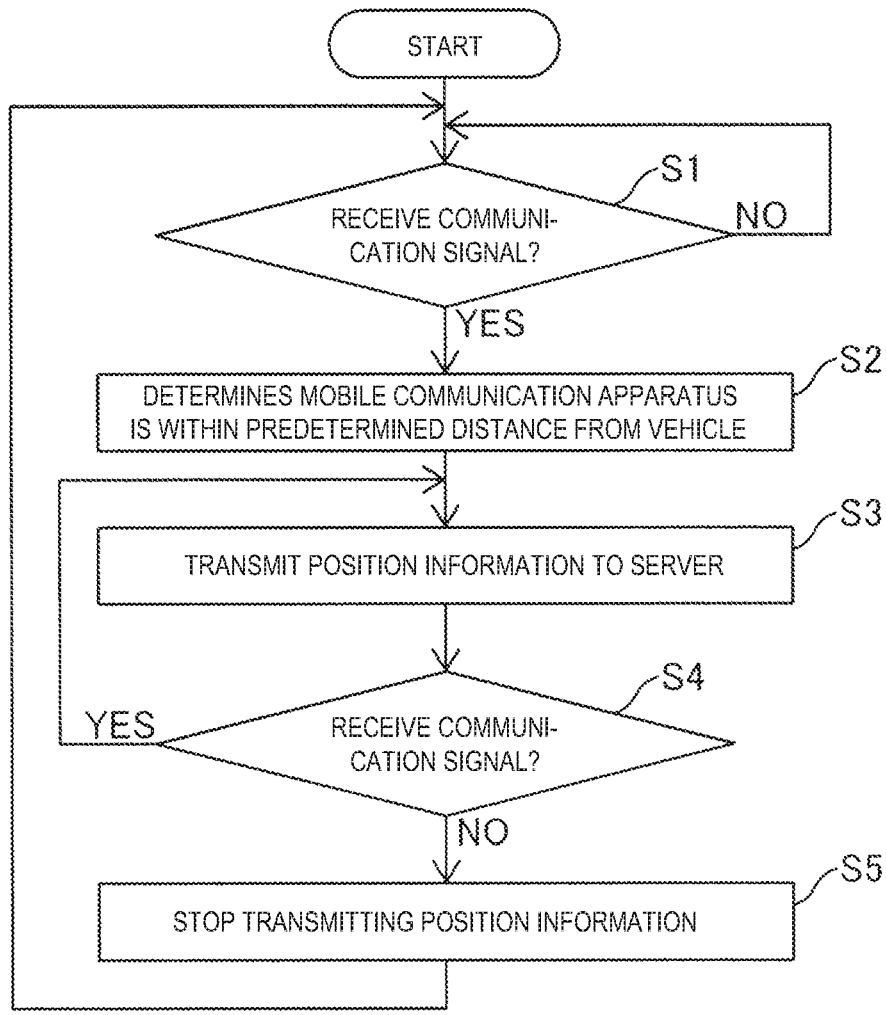
FIG. 3 is a flowchart illustrating an example of a position information transmission process.

Referring to FIG. 3, descriptions are provided an example of how the controller 11 of the mobile communication apparatus 10 performs a position information transmission process.

In step S1 of FIG. 3, the controller 11 determines whether the short-range wireless communication interface 12 receives the communication signal that the onboard communication device 20 transmits. When the short-range wireless communication interface 12 receives the communication signal, the controller 11 proceeds to step S2. When the short-range wireless communication interface 12 receives no communication signal, the controller 11 repeats the process of step S1 until the short-range wireless communication interface 12 receives the communication signal. In step S2, the controller 11 determines that the mobile communication apparatus 10 is within the predetermined distance from the vehicle 30.

In step S3, the controller 11 causes the communication unit 14 to transmit the position information, which the position information obtaining unit 13 obtains, to the management server 40. Incidentally, the position information obtaining unit 13 may always acquire the position, or only in cases where the mobile communication apparatus 10 needs to transmit the position information to the management server 40. In step S4, the controller 11 determines whether the short-range wireless communication interface 12 receives the communication signal that the onboard communication device 20 transmits. When the short-range wireless communication interface 12 receives the communication signal, the controller 11 returns to step S3. When the short-range wireless communication interface 12 receives no communication signal, the controller 11 proceeds to step S5.

In step S5, the controller 11 stops the communication unit 14 from transmitting the position information to the management server 40. Thereafter, the controller 11 returns to step S1.

(Position Management Program)

Figure 4:
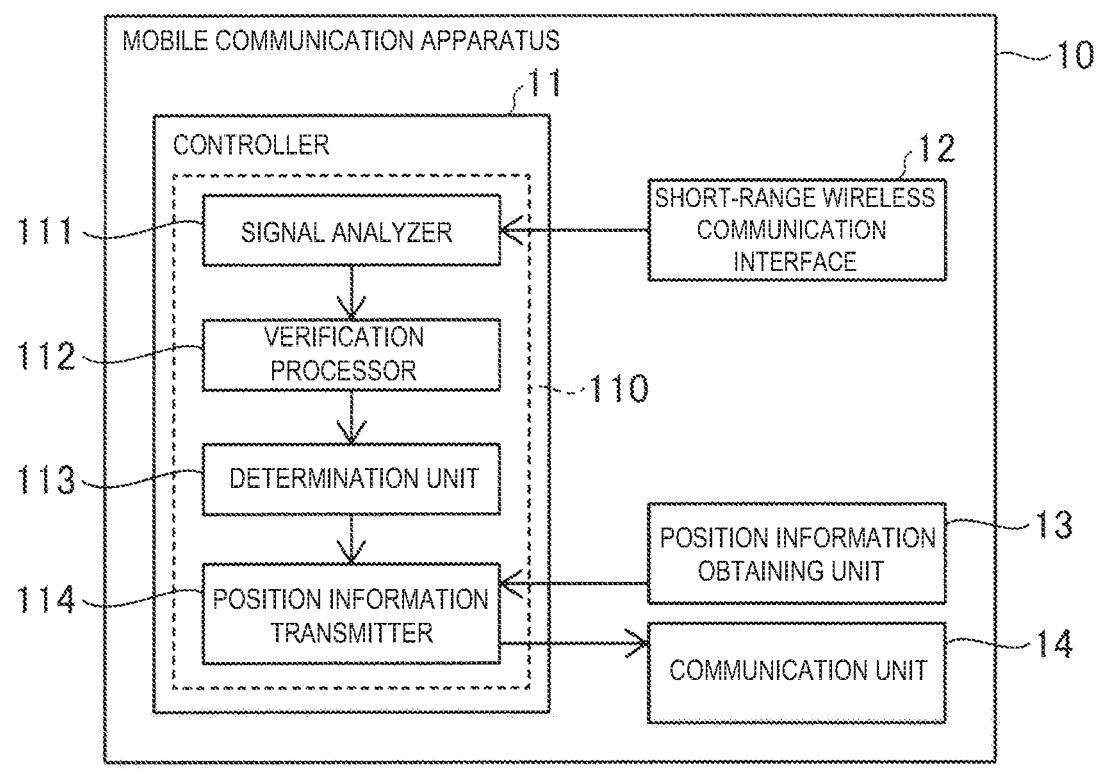
FIG. 4 is a block diagram illustrating an example of how a mobile communication apparatus executes a position management program.

Referring to FIG. 4, descriptions are provided for the position management program 110 that the controller 11 of the mobile communication apparatus 10 executes.

The position management program 110 includes a signal analyzer 111, a verification processor 112, a determination unit 113, and a position information transmitter 114.

The signal analyzer 111 analyzes a content of the communication signal that the short-range wireless communication interface 12 receives. The communication signal that the onboard communication device 20 transmits includes identifier information. The signal analyzer 111 analyzes the communication signal, and thereby extracts the identifier information.

The verification processor 112 transmits the identifier information to an external server in order to verify whether the extracted identifier information is authentic. For example, the verification processor 112 causes the communication unit 14 to transmit the identifier information to the external server via the communication network 60. The external server checks whether the received identifier information is associated with the position management program 110. When the received identifier information is associated with the position management program 110, the external server transmits to the position management program 110 of the mobile communication apparatus 10 information indicating that the identifier information is authenticated. Alternately, the external server may transmit to the position management program 110 an instruction to transmit the position information. Meanwhile, the external server may be the management server 40 for the position management, or a different server. Furthermore, the verification processor 112 may verify whether the identifier information is authentic without communicating with the server.

The determination unit 113 determines whether the identifier information is authenticated. The determination unit 113 determines that the identifier information is authenticated, for example, when the determination unit 113 receives from the external server the information indicating that the identifier information is authenticated. Otherwise, the determination unit 113 may determine that the identifier information is authenticated, when the determination unit 113 receives from the external server an instruction to transmit the position information.

When the identifier information is authenticated, the position information transmitter 114 causes the communication unit 14 to periodically transmit the position information, which the position information obtaining unit 13 obtains, to the management server 40. The position information transmitter 114 may cause the communication unit 14 to transmit to the management server 40 the ID of the vehicle 30, and the identification information included in the communication signal, in addition to the position information. Moreover, the position information transmitter 114 may cause the communication unit 14 to transmit to the management server 40 the ID of the mobile communication apparatus 10 (for example, its telephone number, or the ID of its SIM card), and the ID of the user 101 of the mobile communication apparatus 10 (for example, his/her employee ID number), in addition to the position information.

(Communication Signal Verification Process)

Figure 5:
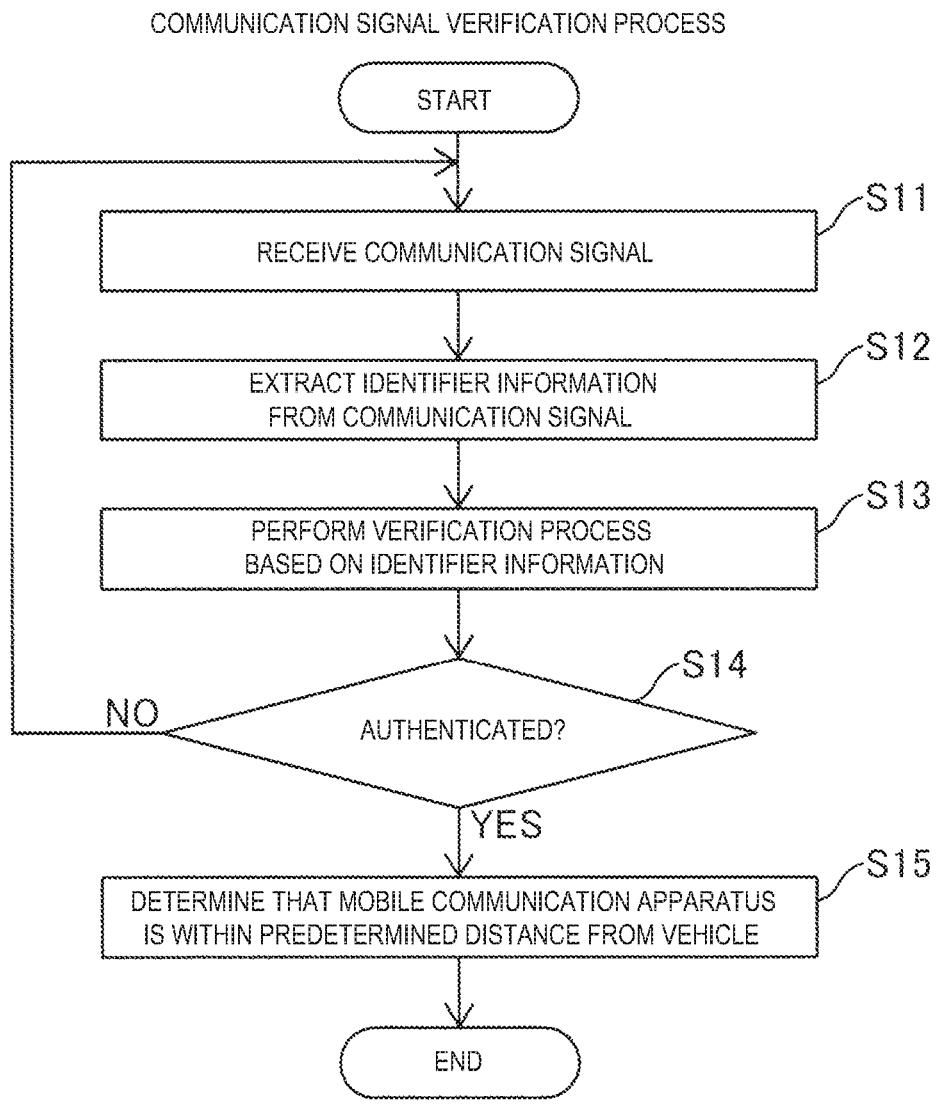
FIG. 5 is a flowchart illustrating an example of how a controller of a mobile communication apparatus performs a communication signal verification process.

Referring to FIG. 5, descriptions are provided for an example of a communication signal verification process that the controller 11 of the mobile communication apparatus 10 performs.

In step S11 of FIG. 5, the short-range wireless communication interface 12 receives the communication signal. In step S12, the signal analyzer 111 extracts the identifier information from the communication signal. In step S13, based on the identifier information, the verification processor 112 performs the verification process.

In step S14, the determination unit 112 determines whether the identifier information is authenticated. When the identifier information is authenticated, the controller 11 proceeds to step S15. When the identifier information is not authenticated, the controller 11 returns to step S11. In step S15, the determination unit 112 determines that the mobile communication apparatus 10 is within the predetermined distance from the vehicle 30. Thereafter, the controller 11 terminates the communication signal verification process.

(Short-Range Wireless Communication Interface Switching Process)

Figure 6:
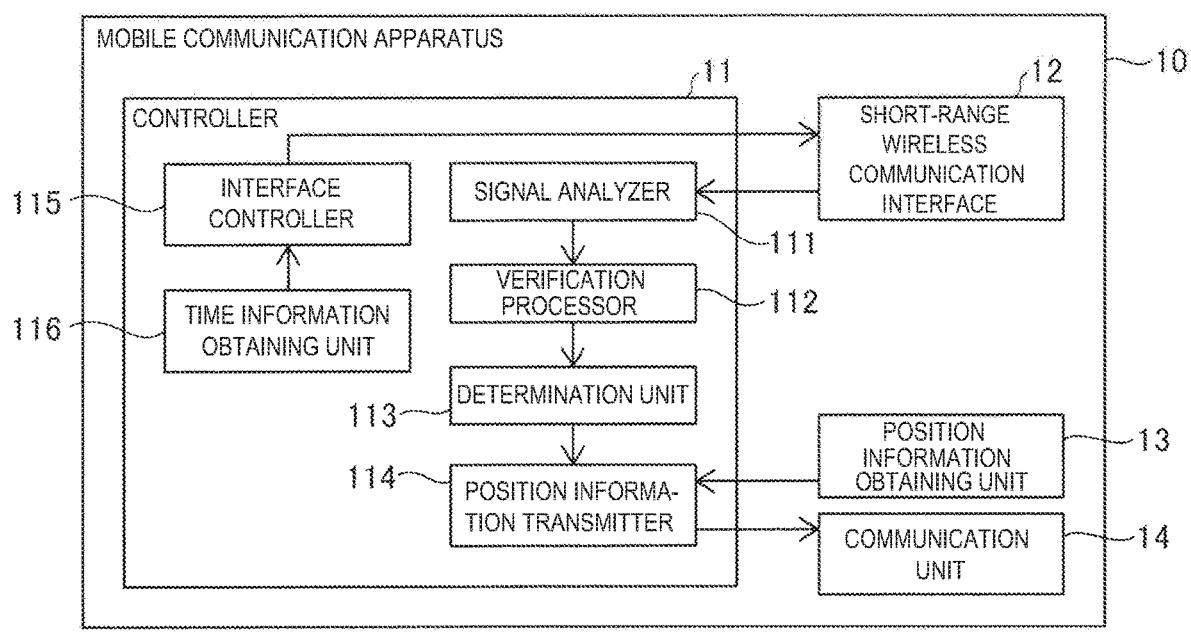
FIG. 6 is a block diagram illustrating an example of how a controller of a mobile communication apparatus performs a short-range wireless communication interface switching process.
Figure 7:
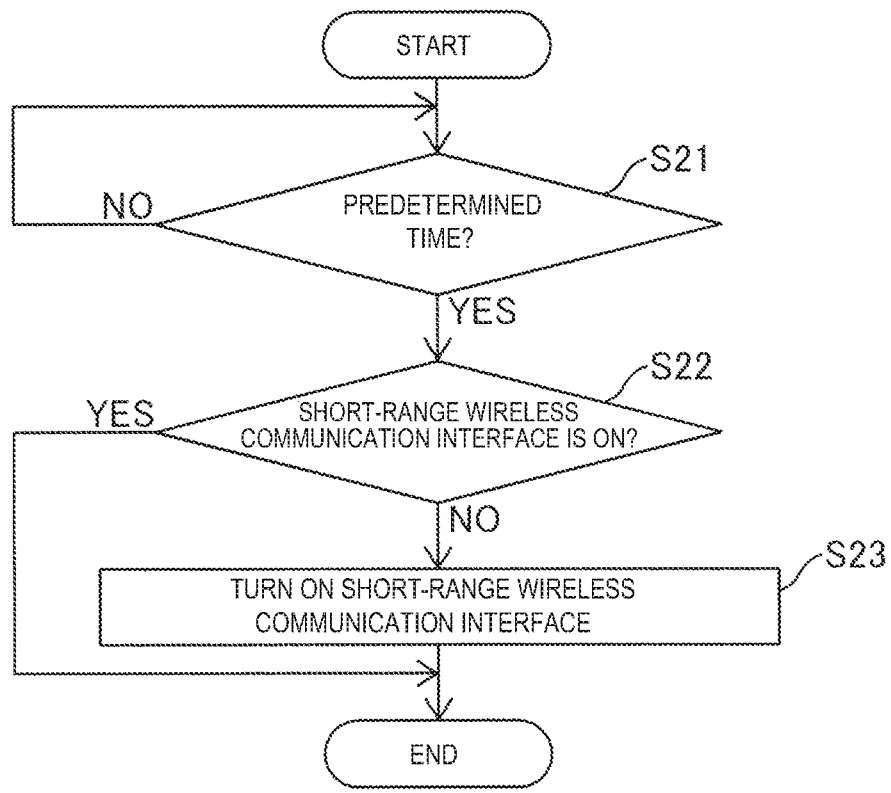
FIG. 7 is a flowchart illustrating a first example of how a controller of a mobile communication apparatus performs a short-range wireless communication interface switching process.

Referring to FIGS. 6 to 7, descriptions are provided for a short-range wireless communication interface switching process that the controller 11 of the mobile communication apparatus 10 performs.

As illustrated in FIG. 6, the controller 11 performs a short-range wireless communication interface switching process by executing an application that includes an interface controller 115 and a time information obtaining unit 116.

The interface controller 115 automatically turns on the short-range wireless communication interface 12 when the short-range wireless communication interface 12 is off at predetermined time. The interface controller 115 automatically turns on the short-range wireless communication interface 12, for example, when the short-range wireless communication interface 12 is off at time when the user 101 of the mobile communication apparatus 10 gets on duty. In addition, the interface controller 115 may automatically turns off the short-range wireless communication interface 12 when the user 101 of the mobile communication apparatus 10 gets off duty. Incidentally, the function of automatically turning off the short-range wireless communication interface 12 may be an optional function. The automatic turnoff function makes it possible to make the power consumption of the mobile communication apparatus 10 lower than in case where the short-range wireless communication interface 12 is always on.

The time information obtaining unit 116 obtains time. Furthermore, using time that the time information obtaining unit 116 obtains, the interface controller 115 switches on and off the short-range wireless communication interface 12. The time information obtaining unit 116 may obtain time via the communication unit 14, or via the position information obtaining unit 13, or via the short-range wireless communication interface In other words, at the predetermined time, the mobile communication apparatus 10 activates its function of receiving the communication signal from the onboard communication device 20. Thereby, when the predetermined time comes, the mobile communication apparatus 10 is capable of activating the function of receiving the communication signal from the onboard communication device 20 even when the communication signal receiving function of the mobile communication apparatus 10 is deactivated. Accordingly, after the predetermined time passes, the mobile communication apparatus 10 can securely receive the communication signal when the mobile communication apparatus 10 is located at a distance close enough to the communication signal. For example, when the short-range wireless communication interface 12 is off while the user 101 of the mobile communication apparatus 10 is on duty, the mobile communication apparatus 10 does not transmit the position information to the management server 40. In this case, the management server 40 cannot manage the position of the vehicle 30 that the user 101 uses. The automatic turn-on of the short-range wireless communication interface 12 makes it possible to manage the position of the vehicle 30, without the user 101 of the mobile communication apparatus 10 manually turning on the short-range wireless communication interface 12.

Referring to FIG. 7, descriptions are provided for a first example of the short-range wireless communication interface switching process.

In step S21 of FIG. 7, the interface controller 115 determines whether the predetermined time comes. When the predetermined time comes, the controller 11 proceeds to step S22. When the predetermined time does not come yet, the controller 11 repeats the process of step S21 until the predetermined time comes. In step S22, the interface controller 115 determines whether the short-range wireless communication interface 12 is on. When the short-range wireless communication interface 12 is on, the controller 11 terminates the short-range wireless communication interface switching process. On the other hand, when the short-range wireless communication interface 12 is off, the controller 11 proceeds to step S23, where the interface controller 115 turns on the short-range wireless communication interface 12. Thereafter, the controller 11 terminates the short-range wireless communication interface switching process.

Figure 8:
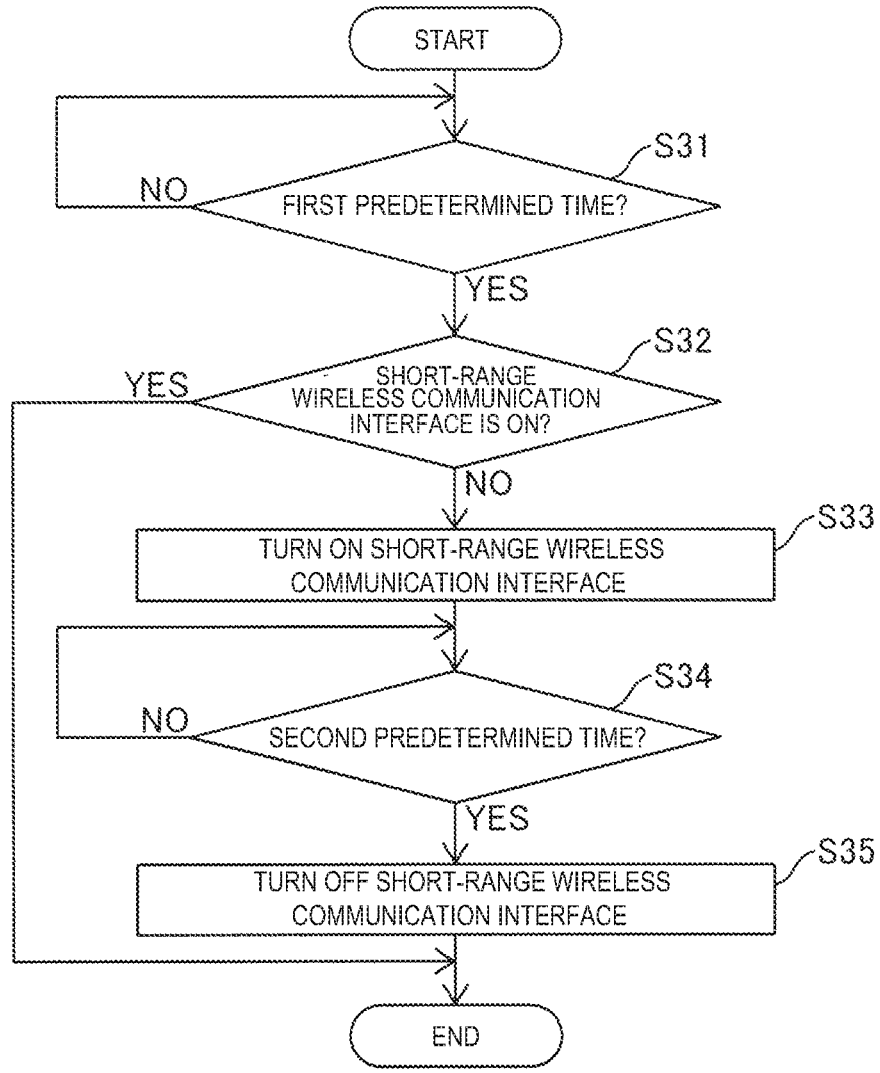
FIG. 8 is a flowchart illustrating a second example of how a controller of a mobile communication apparatus performs a short-range wireless communication interface switching process.

Referring to FIG. 8, descriptions are provided for a second example of the short-range wireless communication interface switching process.

In step S31 of FIG. 8, the interface controller 115 determines whether first predetermined time comes. When the first predetermined time comes, the controller 11 proceeds to step S32. When the first predetermined time does not come yet, the controller 11 repeats the process of step S31 until the first predetermined time comes. In step S32, the interface controller 115 determines whether the short-range wireless communication interface 12 is on. When the short-range wireless communication interface 12 is on, the controller 11 terminates the short-range wireless communication interface switching process. On the other hand, when the short-range wireless communication interface 12 is off, the controller 11 proceeds to step S33, where the interface controller 115 turns on the short-range wireless communication interface 12. The first predetermined time is, for example, time when the user 101 of the mobile communication apparatus 10 gets on duty.

In step S34, the interface controller 115 determines whether second predetermined time comes. When the second predetermined time comes, the controller 11 proceeds to step S35. When the second predetermined time does not come yet, the controller 11 repeats the process of step S34 until the second predetermined time comes. In step S35, the interface controller 115 turns off the short-range wireless communication interface 12. Thereafter, the controller 11 terminates the short-range wireless communication interface switching process. The second predetermined time is, for example, time when the user 101 of the mobile communication apparatus 10 gets off duty.

(Example of Configuration of Support Center)

Referring to FIGS. 9 to 17, descriptions are provided for an example of a configuration of a support center 200 using the position management system 100.

The support center 200 is provided with the management server 40 that manages the positions of the vehicles 30. The support center 200 manages, for example, position information on the vehicles 30 that product maintenance technicians use as company cars. Operators at the support center 200 manage the maintenance technicians' jobs and schedules, based on the position information on the company cars. The operators at the support center 200 also can give instructions to maintenance technicians, based on the position information of the company cars. For example, when receiving an urgent support request for failure or trouble of an apparatus from a client facility 300, an operator at the support center 200 gives a maintenance technician, using a company car near the client facility 300, an instruction to visit the client facility 300 immediately.

Figure 9:
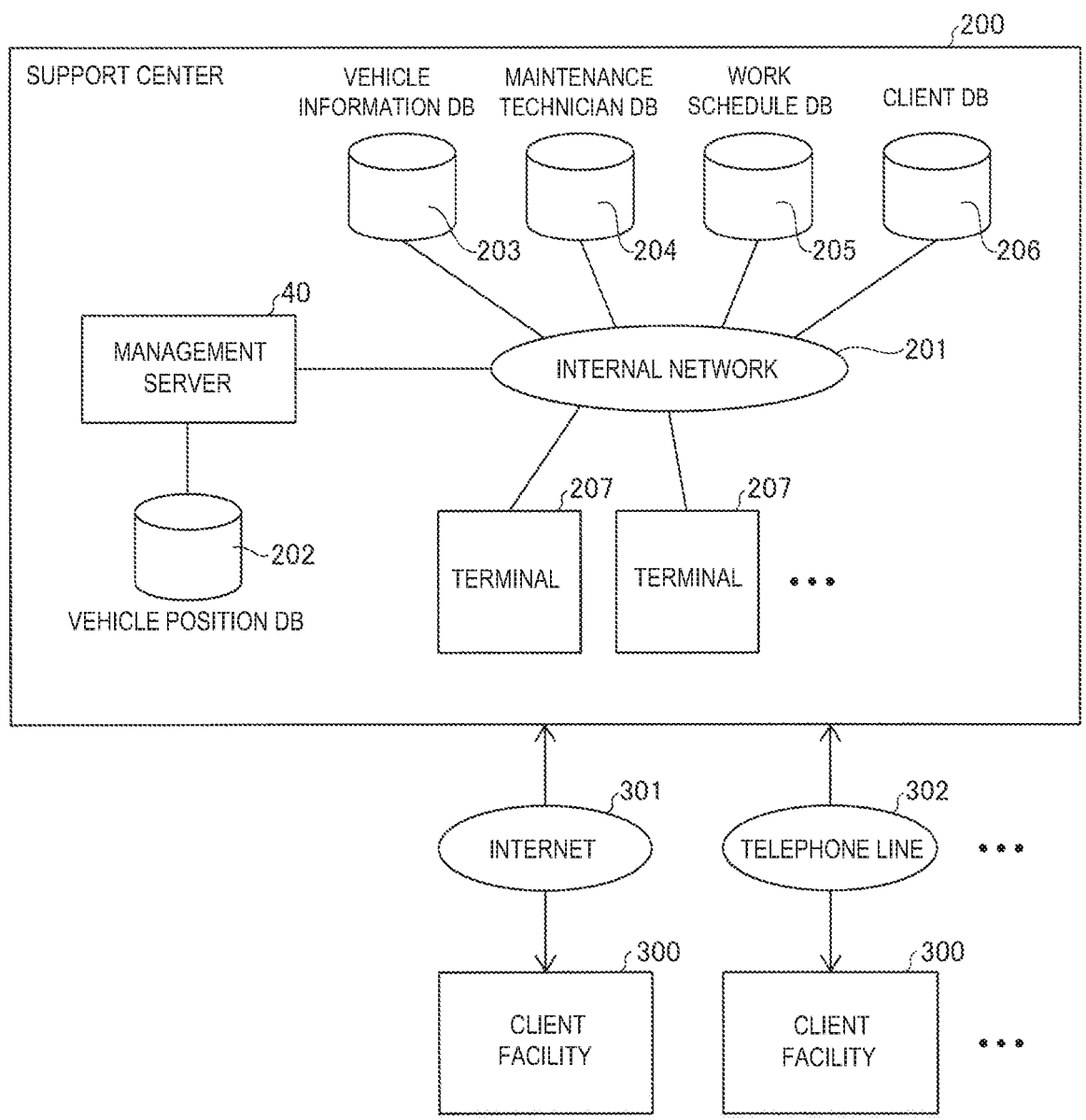
FIG. 9 is a block diagram illustrating an outline of a support center.

As illustrated in FIG. 9, the support center 200 is provided with the management server 40, an internal network 201, a vehicle position database (DB) 202, a vehicle information DB 203, a maintenance technician DB 204, a work schedule DB 205, a client DB 206, and terminals 207. Furthermore, the support center 200 is communicably connected to client facilities 300 through the Internet 301 and telephone lines 301.

The internal network 201 connects internal sections inside the support center 200 such that the internal sections can communicate data with one another. Specifically, the management server 40, the vehicle information DB 203, the maintenance technician DB 204, the work schedule DB 205, the client DB 206, and the terminals 207 are connected to the internal network 201. Furthermore, the vehicle position DB 202 is connected to the internal network 201 via the management server 40. The internal network 201 is, for example, the LAN (local area network).

Each terminal 207 is formed, for example, from a personal computer. Each operator operates his/her personal computer.

The vehicle position DB 202 is a database used to manage the position information on the vehicles 30. As illustrated in FIG. 10, the vehicle position DB 202 includes, for example, vehicle IDs, maintenance technician IDs, and their current position information. The vehicle position DB 202 stores the vehicle IDs, the maintenance technician IDs, and the current position information while associating each vehicle ID with the corresponding mechanical technician ID and current position information. The vehicle position DB 202 may further store histories of the position information, as well as daily, weekly, monthly, etc. travelled mileages. These make it possible for the support center to manage not only the current position information on the vehicles 30, but also the travelled distances, hours, routes and the like of the users 101 of the vehicles 30. The vehicle position DB 202 stores the position information, for example, in the form of coordinate values using latitudes and longitudes.

The vehicle information DB 203 is a database that associates the vehicles 30 with the onboard communication devices 20 provided in the vehicles 30, respectively. As illustrated in FIG. 11, the vehicle information DB 203 includes, for example, the vehicle IDs and beacon IDs. Each onboard communication device 20 transmits its communication signal that includes a beacon ID, and the beacon ID is included in first identification information that includes information on a vehicle 30 provided with the onboard communication device 20. A nearby mobile communication apparatus 10 transmits the first identification information, together with the position information, to the management server 40. Based on the first identification information, the management server 40 associates the position information with the vehicle 30. Thereby, when there are multiple vehicles 30, the support center 200 manages the positions of the respective vehicles 30 distinguishably.

The work schedule DB 205 is a database that records work schedules of the respective users 101 as the maintenance technicians. As illustrated in FIG. 12, the work schedule DB 205 includes, for example, maintenance technician IDs, and scheduled jobs associated with each maintenance technician ID. Each scheduled job is stored including a time slot and a place to visit. In other words, the work schedule DB 205 makes it possible for any operator to check on each maintenance technician's work schedule.

The client DB 206 is a database that records information on the clients. As illustrated in FIG. 13, the client DB 206 includes, for example, client IDs, as well as their client names and position information.

The maintenance technician DB 204 is a database that records the information on the users 101 as the maintenance technicians. The maintenance technician DB 204 includes, for example, the maintenance technician IDs, mobile communication apparatus IDs, attributes, acquired skills. Each maintenance technician's attribute includes, for example, his/her team, and job title. Acquired skills of each maintenance technician include, for example, information on apparatuses that the maintenance technician can provide maintenance service to. Second identification information including information on a mobile communication apparatus 10 includes the corresponding mobile communication apparatus ID. Each mobile communication apparatus 10 transmits the second identification information, together with its position information, to the management server 40. Based on the second identification information, the management server 40 associates the position information with the corresponding user 101 of a vehicle 30. Thereby, the support center can manage the positions of the respective users 101 travelling by the vehicles 30 distinguishably on a user-by-user 101 basis. In other words, the management server 40 can associate the vehicles 30 with the users 101, without in advance registering information on which user 101 is aboard which vehicle 30. In addition, based on the second identification information, the management server 40 associates the position information with the work schedule of the corresponding user 101 of the vehicle 30. Thereby, based on the position and work schedule of each user 101 travelling by a vehicle 30, the support center can easily understand what condition the user 101 is in.

Figure 15:
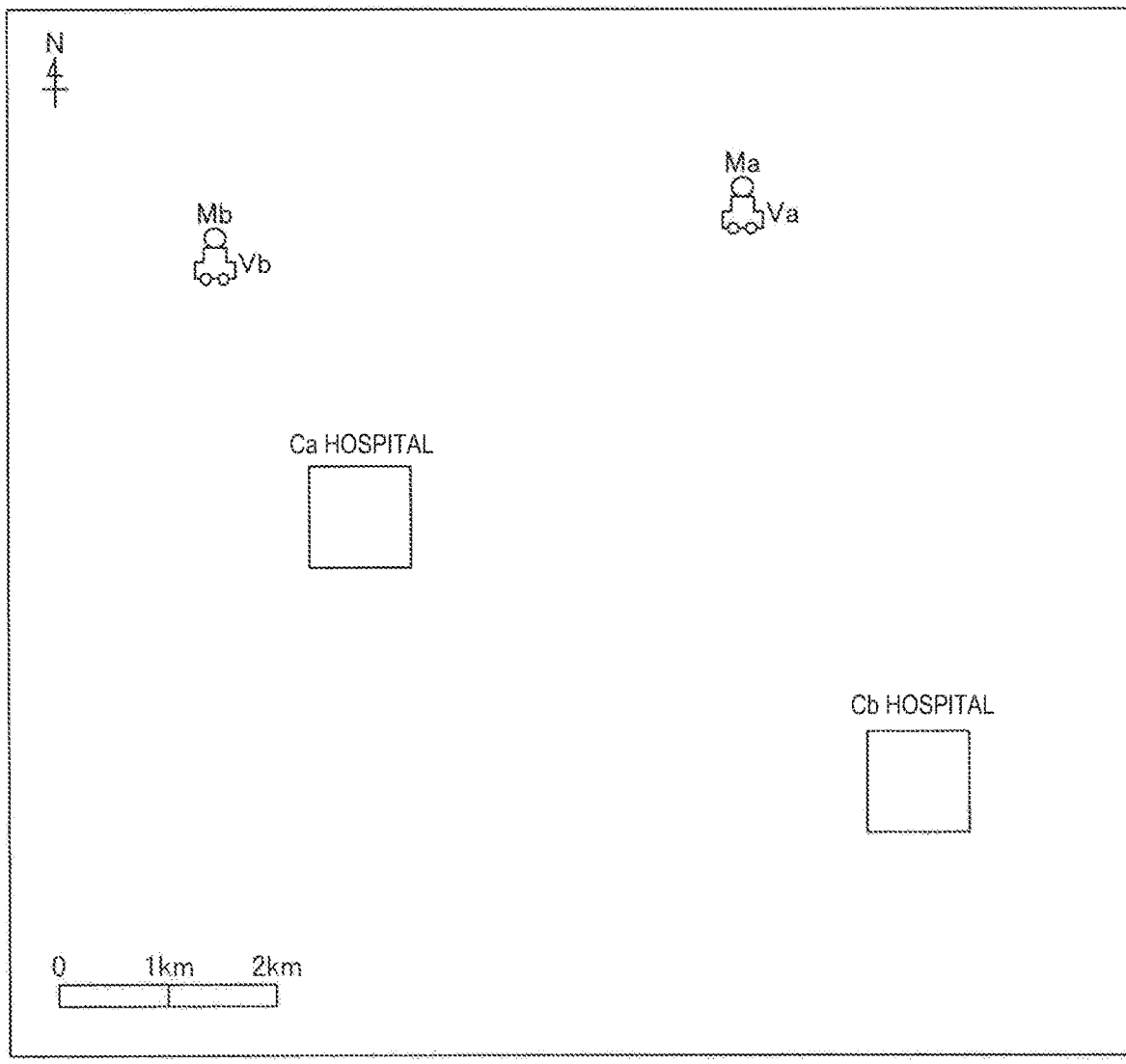
FIG. 15 is a diagram illustrating an example of what a terminal at a support center displays.

Each terminal 207 is capable of displaying the positions of the vehicles 30, and the positions of the users 101 working as the maintenance technicians. One terminal 207 displays a map as illustrated in FIG. 15. In an example illustrated in FIG. 15, the terminal 207 displays Ca Hospital and Cb Hospital. The terminal 207 further displays a position of a vehicle 30 with a vehicle ID of Va, and a position of a user 101 with a maintenance technician ID of Ma who is travelling by the vehicle 30 with a vehicle ID of Va. In addition, the terminal 207 further displays a position of a vehicle 30 with a vehicle ID of Vb, and a position of a user 101 with a maintenance technician ID of Mb who is travelling by the vehicle 30 with a vehicle ID of Vb.

Based on the position information transmitted from mobile communication apparatuses 10, an operator working on a terminal 207 finds vehicles 30 that are within a predetermined distance from a client facility 300, and users 101 of the vehicles 30. Based on work schedule information on the found users 101, the operator determines which user 101 to dispatch to the client facility 300. Thereby, the operator can easily choose a user 101 that is near the client facility 300 and available according to his/her work schedule, from the users 101 of the respective vehicles 30. Accordingly, the operator can dispatch the user 101 to the client facility 300 quickly. Incidentally, a program to be installed in the terminals 207 or the like, instead, may perform the process of determining which user 101 to dispatch to the client facility 300.

Based on the position information transmitted from the mobile communication apparatuses 10, an operator working on a terminal 207 finds vehicles 30 that are within the predetermined distance from the client facility 300, and users 101 of the respective vehicles 30. Based on attribute information on the found users 101, the operator determines which user 101 to dispatch to the client facility 300. Thereby, the operator can easily choose a user 101 that is near the client facility 300 and has an attribute suitable for the client facility 300, from the users 101 of the respective vehicles 30. Accordingly, the operator can quickly dispatch the user 101 having the suitable attribute to the client facility 300. Incidentally, a program to be installed in the terminals 207 or the like, instead, may perform the process of determining which user 101 to dispatch to the client facility 300.

Based on the position information transmitted from the mobile communication apparatuses 10, an operator working on a terminal 207 finds vehicles 30 that are within the predetermined distance from the client facility 300, and users 101 of the vehicles 30. Based on the skill information on the found users 101, the operator determines which user 101 to dispatch to the client facility 300. Thereby, the operator can easily choose a user 101 that is near the client facility 300 and has a skill suitable for the client facility 300, from the users 101 of the respective vehicles 30. Accordingly, the operator can quickly dispatch the user 101 having the suitable skill to the client facility 300. Incidentally, a program to be installed in the terminals 207 or the like, instead, may perform the process of determining which user 101 to dispatch to the client facility 300.

(Position Information Registration Process)

Figure 16:
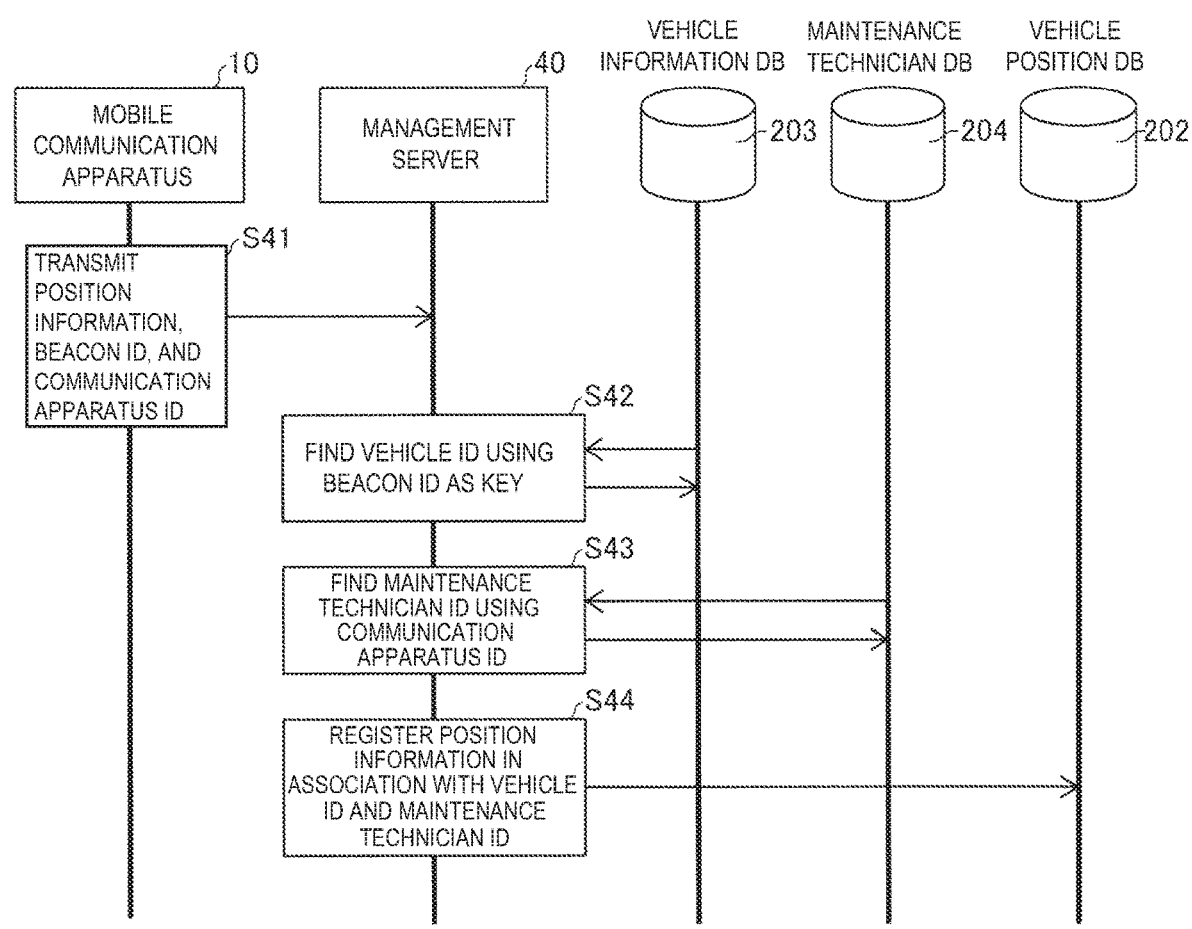
FIG. 16 is a sequence chart illustrating an example of how a management server performs a position information registration process.

Referring to FIG. 16, descriptions are provided for an example of a position information registration process that the management server 40 performs.

In step S41 in FIG. 16, the mobile communication apparatus 10 transmits the position information, the beacon ID and the mobile communication apparatus ID to the management sever 40. In step S42, the management server 40 searches the vehicle information DB 203 using the beacon ID as the key, and finds a vehicle ID. In step S43, the management server 40 searches the maintenance technician DB 204 using the mobile communication apparatus ID as the key, and finds a maintenance technician ID. In step S44, the management server 40 registers the position information in the vehicle position DB 202 with the position information associated with the vehicle ID and the maintenance technician ID. In addition, the management server 40 may be configured to search the work schedule DB 205 using the maintenance technician ID as the key, to find the work schedule of the corresponding maintenance technician, and to associate the found work schedule with the vehicle ID. This makes it possible for the system of the support center 200 to automatically associate the maintenance technician and the vehicle 30. Furthermore, association of the positions of the vehicles 30 with the maintenance technicians make it possible to automatically associate the work schedules managed for the respective maintenance technicians with the positions of the vehicles 30.

(Support Process)

Figure 17:
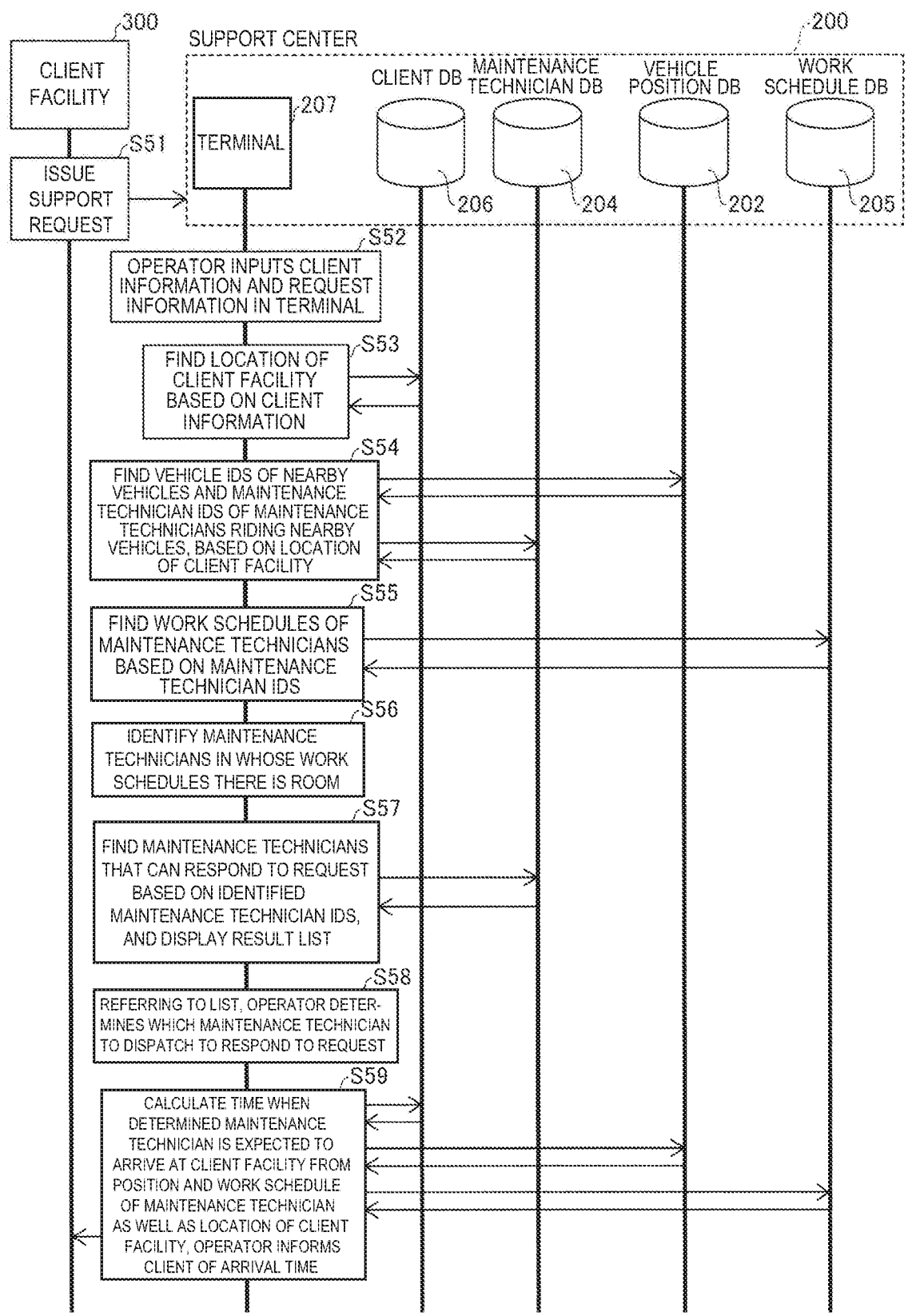
FIG. 17 is a sequence chart illustrating an example of how a support center provides support.

Referring to FIG. 17, descriptions are provided for an example of a support process that the support center 200 performs.

In step S51 in FIG. 17, the client facility 300 issues a support request. In step S52, when receiving the support request, an operator inputs the client information and the request information into a terminal 207. In step S53, the management server 40 searches the client DB 206 based on the client information, and finds the location of the client facility 300.

In step S54, the management server 40 searches the vehicle position DB 202 based on the location of the client facility 300, and finds vehicle IDs of vehicles that are near the client facility 300. Meanwhile, the management server 40 searches the maintenance technician DB 204 based on the location of the client facility 300, and finds maintenance technician IDs of maintenance technicians that are travelling by their vehicles near the client facility 300. In step S55, the management server 40 searches the work schedule DB 205 based on the found maintenance technician IDs, and finds the work schedules of the maintenance technicians with the maintenance technician IDs.

In step S56, the management server 40 identifies maintenance technicians in whose work schedules there is room. In step S57, the management server 40 searches the maintenance technician DB 204 based on maintenance technician IDs of the identified maintenance technicians, finds maintenance technicians that can respond to the support request, and displays a result list on the terminal 207. In step S58, referring to the displayed list, the operator determines which maintenance technician to dispatch to respond to the support request.

In step S59, from the current position and the work schedule of the determined maintenance technician, as well as the location of the client facility 300, the management server 40 calculates time when the maintenance technician is expected to arrive at the client facility 300, using the client DB 206, the vehicle position DB 202 and the work schedule DB 205. The operator informs the client when the maintenance technician is expected to arrive at the client facility 300.

It should be noted that one or more embodiments disclosed herein shows examples in all respects, and shall not be construed as limiting the invention. The scope of the invention is indicated by the appended claims, but not by the foregoing descriptions of one or more embodiments. Furthermore, all changes (modifications) that come within the meaning and range of equivalency of the appended claims are intended to be embraced therein.

The invention claimed is:

1. A position management method using a mobile communication apparatus carried by a user of a vehicle, comprising:
obtaining, by the mobile communication apparatus, position information of the mobile communication apparatus;
receiving, by the mobile communication apparatus, a communication signal transmitted from an onboard communication device provided in the vehicle;
starting transmitting, by the mobile communication apparatus in response to receiving the communication signal transmitted repeatedly at an interval from the onboard communication device, the obtained position information of the mobile communication apparatus to a management server to enable the management server to confirm a position of the vehicle and to confirm that a position of the mobile communication apparatus is within the vehicle; and
stopping transmitting, by the mobile communication apparatus in response to not receiving the communication signal transmitted repeatedly from the onboard communication device, the obtained position information of the mobile communication apparatus to the management server.

2. The position management method according to claim 1, wherein the mobile communication apparatus is capable of using data communications while being carried by the user of the vehicle.

3. The position management method according to claim 1, further comprising:
   determining that the vehicle is within a predetermined distance from the mobile communication apparatus in a case in which the mobile communication apparatus receives the communication signal, and
   wherein transmitting the obtained position information to the management server comprises transmitting, from the mobile communication apparatus, the obtained position information to the management server in a case in which the vehicle is determined to be within the predetermined distance from the mobile communication apparatus.

4. The position management method according to claim 1, wherein the onboard communication device transmits the communication signal in compliance with a predetermined short-range wireless communication standard.

5. The position management method according to claim 4, wherein the onboard communication device transmits the communication signal in compliance with a predetermined low-power short-range wireless communication standard.

6. The position management method according to claim 1, wherein the onboard communication device transmits the communication signal such that the communication signal reaches a location within range of the vehicle and accessible to the user of the vehicle.

7. The position management method according to claim 1, wherein the onboard communication device transmits the communication signal in compliance with a predetermined short-range wireless communication standard comprising a theoretical reachable distance in a range of 2 meters or less.

8. The position management method according to claim 1, further comprising activating, at predetermined time, a function of the mobile communication apparatus for receiving the communication signal transmitted from the onboard communication device.

9. The position management method according to claim 1, further comprising:
   transmitting, from the mobile communication apparatus, identification information, together with the position information, to the management server, wherein the identification information is included in the communication signal and comprises information on the vehicle; and
   associating, by the management server, the position information with the vehicle based on the identification information.

10. The position management method according to claim 1, further comprising:
    transmitting, from the mobile communication apparatus, identification information, together with the position information, to the management server, wherein the identification information comprises information on the mobile communication apparatus; and
    associating, by the management server, the position information with the user of the vehicle based on the identification information.

11. The position management method according to claim 10, further comprising associating, by the management server, the position information with a work schedule of the user of the vehicle based on the identification information.

12. The position management method according to claim 1, wherein
    the vehicle comprises a plurality of vehicles equipped with respective mobile communication apparatuses, and
    the method further comprises:
       finding one or more vehicles and one or more users of the one or more vehicles that are within a predetermined distance from a client facility based on the position information transmitted from the respective mobile communication apparatuses;
       obtaining work schedule information on the found one or more users; and
       determining which user to dispatch to the client facility based on the obtained work schedule information.

13. The position management method according to claim 1, wherein
    the vehicle comprises a plurality of vehicles equipped with respective mobile communication apparatuses, and
    the method further comprises:
       finding one or more vehicles and one or more users of the one or more vehicles that are within a predetermined distance from a client facility based on the position information transmitted from the respective mobile communication apparatuses;
       obtaining attribute information on the found one or more users; and
       determining which user to dispatch to the client facility based on the obtained attribute information.

14. The position management method according to claim 1, wherein
    the vehicle comprises a plurality of vehicles equipped with respective mobile communication apparatuses, and
    the method further comprises:
       finding one or more vehicles and one or more users of the one or more vehicles that are within a predetermined distance from a client facility based on the position information transmitted from the respective mobile communication apparatuses;
       obtaining skill information on the found one or more users; and
       determining which user to dispatch to the client facility based on the obtained skill information on the found one or more users.

15. The position management method according to claim 1, further comprising:
    receiving, by the mobile communication apparatus, a position acquisition signal transmitted by a signal transmitter; and
    obtaining, by the mobile communication apparatus, the position information in response to receiving the position acquisition signal.

16. The position management method according to claim 1, wherein
    the starting transmitting comprises starting transmitting, by the mobile communication apparatus in response to receiving the communication signal transmitted from the onboard communication device, the obtained position information of the mobile communication apparatus to the management server every time the mobile communication apparatus moves a predetermined distance.

17. The position management method according to claim 1, wherein
    the starting transmitting comprises starting transmitting, by the mobile communication apparatus in response to receiving the communication signal transmitted from the onboard communication device, the obtained position information of the mobile communication apparatus to the management server at a predetermined time interval.

18. The position management method according to claim 1, wherein the communication signal is transmitted from the onboard communication device at a regular time interval.

19. A position management system comprising:
a mobile communication apparatus comprising a position information obtaining unit that obtains position information of the mobile communication apparatus;
an onboard communication device that is provided in a vehicle and that repeatedly transmits a communication signal at an interval; and
a management server, wherein
the mobile communication apparatus, in response to receiving the communication signal transmitted repeatedly from the onboard communication device, starts transmitting the position information of the mobile communication apparatus to the management server to enable the management server to confirm a position of the vehicle and to confirm that a position of the mobile communication apparatus is within the vehicle, and
the mobile communication apparatus, in response to not receiving the communication signal transmitted repeatedly from the onboard communication device, stops transmitting the obtained position information of the mobile communication apparatus to the management server.

20. A non-transitory computer-readable recording medium storing a position management program that causes a mobile communication apparatus carried by a user of a vehicle to perform operations comprising:

obtaining, by the mobile communication apparatus, position information of the mobile communication apparatus;

receiving, by the mobile communication apparatus, a communication signal transmitted from an onboard communication device provided in the vehicle;

starting transmitting, by the mobile communication apparatus in response to receiving the communication signal transmitted repeatedly at an interval from the onboard communication device, the obtained position information of the mobile communication apparatus to a management server to enable the management server to confirm a position of the vehicle and to confirm that a position of the mobile communication apparatus is within the vehicle; and stopping transmitting, by the mobile communication apparatus in response to not receiving the communication signal transmitted repeatedly from the onboard communication device, the obtained position information of the mobile communication apparatus to the management server.

* * * * *